Patented Oct. 7, 1941

2,257,960

UNITED STATES PATENT OFFICE 2,257,960

CLEANING ALUMINUM SURFACES

William M. Humphrey, Jackson Heights, and Robert E. Lee, Jamaica, N. Y.

No Drawing. Application January 12, 1939, Serial No. 250,570

4 Claims. (Cl. 148—8)

This invention relates to improvements in the cleaning of aluminum cooking utensils and the cleaning and removing of the various oxides from surfaces of aluminum and aluminum alloys, etc.; and the invention includes a new cleaning composition, a new method of producing the same, and a new method of cleaning surfaces of aluminum and aluminum alloys, etc. to remove oxides therefrom.

The invention relates particularly to the cleaning of aluminum cooking utensils and other aluminum and aluminum alloy surfaces whereby the necessity of the use of abrasives or scouring such surfaces is eliminated as well as the necessity of heating or raising the temperature of the surfaces or of a chemical cleaner to remove the corrosion or oxides. The present invention enables the surfaces to be cleaned chemically by a cold method.

It is well known that aluminum cooking utensils as well as castings and other structural elements made of aluminum or aluminum alloys frequently require cleaning for the removal of scale or aluminum oxide; and the present invention is particularly valuable for use for that purpose. The invention is, however, of broader application, e. g., to the treatment of surfaces of other metals and their alloys, such as copper, brass and nickel.

The invention includes a new cleaning composition, which may be in liquid, paste, or dry, powdered form containing available fluorine and made by compounding a suitable fluoride with phosphoric or phosphorous acid; and advantageously also containing a colloidal clay such as bentonite.

The fluoride which we have found particularly advantageous for use in making the new cleaning composition is cryolite, a fluoride of aluminum and sodium. Other suitable fluorides can be used, such as alkali fluorides, although in general we consider their use less advantageous than the use of cryolite.

As one example of the invention, a cleaning composition can be made of equal parts of phosphoric (or phosphorous) acid, cryolite, and bentonite, this composition, when suitably prepared, being of the consistency of a paste or cream.

Such a composition can advantageously be prepared by admixing the cryolite and phosphoric acid, using acid of 75 or 85% strength, and permitting the cryolite and acid to react for a limited period of time, and then, before the mixture sets to a solid, adding the bentonite and intimately compounding it with the other ingredients.

As another example of preparing the new composition, the cryolite is mixed with twice its weight of phosphoric acid of the strength above indicated, the mixture is allowed to stand about twenty-four hours, the excess liquor is decanted, and the product is powdered and mixed until dry with bentonite.

As another example, equal parts by weight of phosphoric acid and cryolite are intimately mixed and after standing about an hour at room temperature there is added an amount of bentonite equal to the total weight of acid and cryolite used, and the whole thoroughly intermixed.

Apparently some chemical reaction takes place between the cryolite and phosphoric acid, so that the resulting composition may contain reaction products in addition to any unchanged cryolite and acid.

The cryolite should be used in a finely divided state, e. g., in the form of a 200-mesh powder, and the bentonite should likewise be used in a similar finely divided state. The phosphoric acid, as above illustrated, may be 75% or 85% acid.

The addition of a colloidal clay such as bentonite is important in forming a product containing the active ingredients in a form which can be readily handled and used, e. g., in the form of a paste or dry powder. The composition can also be prepared and dispensed in liquid form.

The cleaning of surfaces of aluminum or aluminum alloy with the new composition is readily accomplished by applying the composition to the cold surface to be cleaned, allowing it to remain two or three minutes and then removing by wiping or washing the resulting compound off with water. In the case of a dry powder a small amount of water can be used, or the powder can be applied with a wet cloth, to moisten the composition or surface and permit the chemical action of the composition on the oxide or scale to take place. The invention provides a simple, safe, efficient and inexpensive cleaner and method of cleaning such aluminum, etc. surfaces.

The new composition is advantageously prepared in the form of a paste or cream such that it can be dispensed from a collapsible tube. The presence of a colloidal clay such as bentonite in proper proportions is advantageous in maintaining the product in a mobile or pasty consistency.

It will be evident, however, that varying proportions of the ingredients can be used depending upon the consistency desired in the cleaning composition and to provide stronger or weaker compositions when needed.

While we do not wish to limit ourselves by any theoretical explanation of the action of the cleaner, we are led to believe that its action is due largely to the presence of available or reactive fluorine, present in such a state or condition that it forms an effective reactive ingredient in dissolving or removing the aluminum oxide or similar oxide scale from the surface to be cleaned.

The striking rate of solution of or reaction with the aluminum oxide seems to indicate that the speed of reaction is not due to hydrogen ion activity or to diffusibility or valence of the ion, but is probably due to the action or catalytic effect of the anion, that is, to the fluorine ion rather than to the concentration of the acid present. The combination of chemicals used and the reactions which take place in making the cleaning composition and in cleaning aluminum, etc. surfaces therewith make the composition a particularly valuable one in enabling aluminum oxide or hydrous alumina to be dissolved or caused to react therewith.

An important advantage of the new composition and cleaning method is that the composition can be applied cold and the cleaning accomplished by a cold method and without heating. Heating of the composition or surface increases its action somewhat but the composition can readily and safely be used cold and acts rapidly in a short period of time to accomplish effective cleaning and removal of aluminum oxide, etc. from the surfaces treated.

While we refer to the composition as comprising or compounded from phosphoric (or phosphorous) acid, a fluoride, such as cryolite, and advantageously also a colloidal clay such as bentonite, it is probable that the composition itself is largely made up of reaction products of the acid with the cryolite and to some extent with the bentonite, and it seems to be due to the reaction products present in the composition and formed on application to the surface to be cleaned that the composition has its unusual effectiveness.

We claim:

1. A new cleaning composition particularly adapted for removing aluminum oxide, etc. from aluminum surfaces, compounded from a material of the class consisting of phosphoric and phosphorous acids, a fluoride reactive with such material, and a colloidal clay, said composition, when applied to such surfaces, supplying available fluorine for cleaning such surfaces.

2. A new cleaning composition particularly adapted for removing aluminum oxide, etc. from aluminum surfaces, compounded from phosphoric acid, cryolite and bentonite, said composition, when applied to such surfaces, supplying available fluorine for cleaning such surfaces.

3. The method of cleaning aluminum surfaces to remove oxide, etc. therefrom which comprises applying thereto the cleaning composition of claim 1.

4. The method of cleaning aluminum surfaces to remove oxide, etc. therefrom which comprises applying thereto the cleaning composition of claim 2.

WILLIAM M. HUMPHREY.
ROBERT E. LEE.